United States Patent [19]

Stark

[11] 4,066,544
[45] Jan. 3, 1978

[54] METHOD AND APPARATUS FOR ELECTRO SHOCK DEGERMINATION OF WATER

[75] Inventor: Walter Stark, Magliaso, Switzerland

[73] Assignee: Multorgan S.A., Magliaso, Switzerland

[21] Appl. No.: 720,195

[22] Filed: Sept. 3, 1976

[30] Foreign Application Priority Data

Sept. 8, 1975 Switzerland .................. 11643/75

[51] Int. Cl.² .................. C02B 3/06; B03C 1/30
[52] U.S. Cl. .................. 210/64; 210/222; 21/54 R; 21/102 R
[58] Field of Search .................. 210/42 S, 63 Z, 63 R, 210/64, 223, 222; 21/54 R, 102 R; 317/4

[56] References Cited

U.S. PATENT DOCUMENTS

| | | | |
|---|---|---|---|
| 3,345,594 | 10/1967 | Vermeiren | 210/222 |
| 3,654,149 | 4/1972 | Hedgpeth | 210/63 R |
| 3,818,269 | 6/1974 | Stark | 317/4 |
| 3,876,373 | 4/1975 | Glyptis | 21/54 R |

Primary Examiner—Charles N. Hart
Assistant Examiner—Ernest G. Therkorn
Attorney, Agent, or Firm—Werner W. Kleeman

[57] ABSTRACT

A method of, and apparatus for, the degermination of water wherein the water which is to be freed of germ is subjected to the action of air ions. The water is exposed to an air-air ion mixture having a content of at least $5.10^6$ air ions per cm³, and at the region where the air-air ion mixture is effective at the water to be degerminated there is produced a magnetic field which passes through such water.

14 Claims, 1 Drawing Figure

U.S. Patent   Jan. 3, 1978   4,066,544
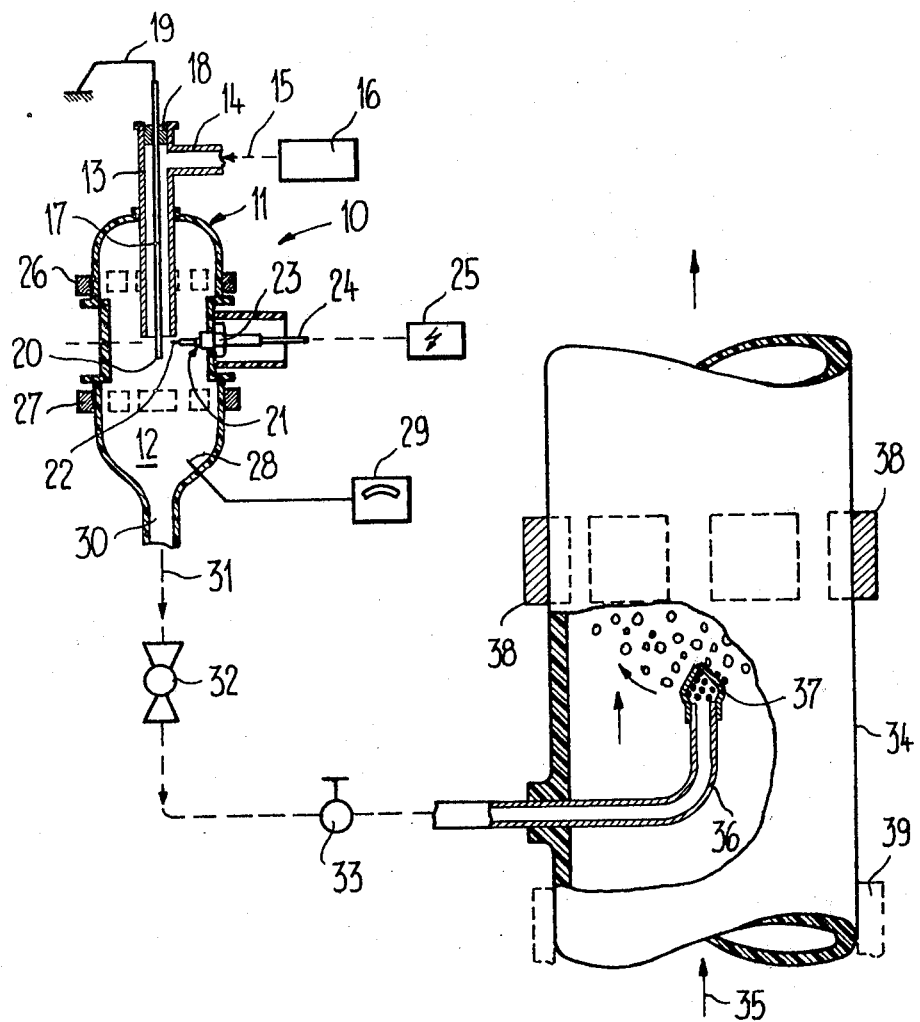

METHOD AND APPARATUS FOR ELECTRO SHOCK DEGERMINATION OF WATER

BACKGROUND OF THE INVENTION

The present invention relates to a new and improved method of, and apparatus for, the degermination of water utilizing the principle of exposing the water to be degerminated to the action of air ions.

The proposed method is especially, however not exclusively, applicable for the degermination of water intended to be used for swimming pools or the like or water delivered from water tanks or containers and intended for use as drinking water.

Therefore, in the context of this disclosure there should be understood the expression "degermination" not merely the attainment of an absolutely germless condition, rather, and especially, also a considerable reduction in the number of germs contained in the water to be degerminated. Further, the term "germ," either in the singular or plural, is intended to encompass bacteria and other micro-organisms which are to be removed from the treated water and can be eliminated by the teachings of the invention.

A review of the heretofore known techniques for the degermination of water permits classification thereof into three different groups.

The first group encompasses the most widespread method which resides in introducing bactericide chemicals into the water to be degerminated, for instance chlorine gas or compounds releasing chlorine gas, bromine and/or ozone. These chemicals are added to the water to be freed of germs or also, for instance, formed in the water itself by electrolytic processes by utilizing special electrode materials. After degermination chemical residues remain in the water which, depending upon the intended use of such water, can be removed during a further working step.

The second group, which is less frequently employed, relies upon the principle of so-to-speak mechanically removing germs. Belonging to such method are those wherein the water to be degerminated is exposed to ultra filtration.

The third group of prior art water degermination methods contemplates exposing the water to be degerminated to the action of air ions. Such method is disclosed, for instance, in Swiss Pat. No. 444,065. This state-of-the-art method relates to the post-treatment of pre-clarified waste water by gasification and contemplates gasifying the pre-clarified waste water with an ionized, oxygen-containing gaseous mixture during such time as the water is conducted in a state of turbulent flow through a closed conduit. This heretofore known method strives for oversaturation of the treated water with ions having an affinity for oxidation and produced by ionization, for instance activated oxygen or ozone, and contemplates accelerating the decomposition (oxidation) of the organic contaminants contained in the water. The thus resulting degermination action of the ozone constitutes an apparently not undesired side effect.

Although the bacteriostatic effect of air ions is disputed, the bactericide effect of such air ions was heretofore not known; in fact the same was even refuted.

This presumption was obvious since notwithstanding the frequent use of such terms as "ionized air" or "active air" in relevant publications, the corresponding tests were not carried out with pure air ions, rather always essentially with ozone ($O_3$), the bactericide effect of which was not in dispute.

In Swiss Pat. No. 524,112, which essentially corresponds to U.S. Pat. No. 3,810,269, there is disclosed, among other things, a method for producing air ions. In this patent there is also taught which ions are to be designated as "air ions" and the frequency as well as the concentration with which such normally occur. In a more general manner and for purposes of understanding the present invention it may be stated that under the expression "air ions" there is to be understood molecules of the gases (also water vapor) present in air, at the other shell of one or more atoms of which there can be removed or added one or more electrons by supplying energy, which, however, are not disassociated. In the context of the foregoing there thus should be primarily understood such ions under the expression "air ions." Further, it should be understood that during their production it is impossible to avoid the formation of a certain quantity of ozone. In any event an air ion is a particle having a comparatively high electrical potential.

SUMMARY OF THE INVENTION

The invention strives to utilize this potential in order to subject the germs or bacteria to a type of deadly electro-shock.

In practice, it has been determined for instance that the cell membrane potential of a germ or bacteria (*escherizia coli*) amounts to 10 mV. The cell nucleus is positive and the electro-magnetic oscillations emanating from the dipole, cell nucleus-cell membrane, indicates the life of the germ. If such oscillations are externally influenced then the further life of the germ becomes more difficult or even suppressed.

Government regulations or typically prevailing laws only permit a limited total count of, for instance, 2,000 germs or bacteria per $cm^3$ in the water, in order that such is unquestionably innocuous to the health of humans. This corresponds to a dilution of $1:10^{22}$ related to the number of water molecules for each $cm^3$. With 2,000 air ions per $cm^3$ air, corresponding approximately to the upper boundary of the naturally existing ion concentration, there however is present a dilution of $1:10^{16}$ related to the existing gas molecules.

The air ions tend to however combine after a short period of time to form so-called "clusters" or ion bunches and the dilution of "clusters" related to the existing gas molecules is therefore greater by a number of powers than the indicated number of $1:10^{16}$; in fact it approaches the dilution number $1:10^{22}$ given for the germs or bacteria.

When a "cluster" meets a germ or bacteria having a considerable potential difference relative to such "cluster," then the germ experiences a sudden potential jump or surge, resulting in rupture of its cell membrane and flow of its plasma, which in turn kills such germ or bacteria. It is immaterial whether the polarity of the air ion-cluster is positive or negative, what is decisive is only the potential difference relative to the germ or bacteria.

However, with the extremely high dilutions a low probability exists that an air ion-cluster will come into contact with a bacteria during its longevity which in any event is limited due to contact with the water. In other words: it can be assumed that the previously discussed phenomenon between an air ion-cluster and a germ or bacteria (without the use of additional measures) only arises very seldon, so that it is not really effectively possible to think in terms of a measurable reduction of the bacteria or germs.

Hence, it is a primary object of the present invention to provide a new and improved method of, and apparatus for, increasing this low probability of killing the bacteria or germs by electro-shock such that there can be obtained an effective result within an acceptable time span.

Now in order to implement this object and others which will become more readily apparent as the description proceeds, the proposed method of the present invention is manifested by the features that the water is exposed to an air-air ion mixture having a content of at least $5.10^6$ air ions per cm$^3$, and at the region where there is effective the air-air ion mixture at the water to be degerminated there is produced a magnetic field which penetrates such water.

On the one hand, there is considerably increased the ion concentration in the air-air ion mixture in relation to the naturally existing concentration. On the other hand, the water to be degerminated is subjected to a magnetic field. It has been surprisingly found that in the presence of a magnetic field the germs or bacteria dispersed in the water have the tendency of migrating from the regions having a higher field intensity or induction, respectively, towards those of lower field intensivity or induction respectively.

Additionally, due to the coaction of the magnetic field on the one hand with the quantity of water plus air-air ion mixture there are formed electromagnetic alternating fields, by means of which there occur high-frequency electromagnetic oscillations in the lower centimeter-wavelength range, which likewise have at least a bacteriostatic effect as demonstrated by the investigations carried out by Barnothy and All in 1970.

To practice the method there is proposed an apparatus which, according to the invention, comprises an ion generator, the outlet of which is connected with a section of a conduit conducting the water to be degerminated or a vessel containing such water and formed of an electrically insulating material. At the outlet region for the ions there are provided means for generating the magnetic field.

BRIEF DESCRIPTION OF THE DRAWING

The invention will be better understood and objects other than those set forth above, will become apparent when consideration is given to the following detailed description thereof. Such description makes reference to the annexed drawing wherein the single FIGURE schematically illustrates, partially in sectional view, a preferred construction of apparatus for the performance of the method.

BRIEF DESCRIPTION OF THE PREFERRED EMBODIMENTS

Describing now the drawing, in the single FIGURE there is shown partially in sectional view an apparatus for the continuous performance of the method in conjunction with flowing water. An ion generator 10 will be understood to comprise an ionization chamber or compartment 12 surrounded by an essentially cylindrical housing 11 formed of plastic. Protruding into the ionization chamber 12 is a pipe connection 13, likewise formed of plastic, the section of which located externally of the housing 11 has a branched portion 14 connected through the agency of a pipe or tubular conduit 15 with a compressed air source 16, for instance a blower or compressor, especially a diaphram or membrance compressor. The pipe connection 13 surrounds at a considerable radial spacing an electrode 17, formed for instance of gold-plated brass. Electrode 17 is supported by an electrically insulating stopper 18, for instance formed of a casting resin, in the pipe connection 13. This electrode 17 is grounded by means of a suitable line or conductor 19, i.e., maintained at null potential. By means of the end 20 of the electrode 17 which is located in the ionization chamber 12 such electrode 17 protrudes past the end of the pipe connection 13. At the height of such electrode end 20 a number of discharge electrodes 21, only one of which is visible in the drawing, protrude into the housing 11 in the manner of a rim of rays directed towards the electrode 17.

These discharge electrodes 21 possess a discharge tip 22 and a throughpassage connection 23 provided with threading, by means of which they can be threadably connected in appropriate threaded bores of the housing 11. The discharge tips 22 are connected via a high-voltage line 24 with a high-voltage generator 25. Such generator 25 is preferably constructed in the manner disclosed in the previously mentioned Swiss Pat. No. 524,112 or U.S. Pat. No. 3,818,269, to which reference may be readily had and the disclosure of which is incorporated herein by reference, and produces a pulsating direct-current voltage of sufficient amplitude so that corona discharges are formed between the tips 22 and the electrode 17. These discharges in turn produce air ions in the air current moving through the pipe connection 13. The air ions, as is known, constitute electrically charged particles. In order to maintain such focused as closely as possible at the axis of the housing 11 there are attached at its outer surface in a respective rim the permanent magnets 26 and 27, the arrangement of which and the magnetization direction of which is chosen in conventional manner such that there is produced the desired focusing of the formed ion cloud. The concentration of the air ions in the air-air ion mixture formed in the ionization chamber 12 is measured by means of a probe 28 which is connected to a so-called SK-measuring device 29.

The ionization chamber 12 possesses an outlet 30 which is connected to a pipe or tubular conduit 31 in which there is mounted a quantity or volume regulating valve 32 and a closure valve 33. The pipe or tubular conduit 31, which likewise is fabricated from an electrically insulating material and constructed as short as possible, leads into a further pipe or tubular conduit 34 where there is introduced by not particularly illustrated means the water to be degerminated and which flows in the direction of the arrow 35. The pipe or tubular conduit 34 is also formed of an electrically insulating material, for instance plastic, such as polyethylene. Conceptually, the member 34 may be also considered to constitute a housing or vessel containing the water to be treated.

The tubular conduit 34 internally possesses a pipe bend 36, at the free end of which there is attached a nozzle head 37, for instance in the form of a single nozzle, or, as illustrated, in the form of a spray head. The air-air ion mixture which, for instance, may be at an excess pressure, for example amounting to at least 0.1 bar, is thus finely distributed in the form of bubbles into the water. Of course, instead of the air-air ion mixture being at an overpressure relative to the water such air-air ion mixture and the water may merely possess a pressure differential of gradient relative to one another, and it would even be conceivable to have the water sucked into the air-air ion mixture.

Following the nozzle head 37 there is secured to the outside of the pipe conduit 34 a rim of magnets 38 having a magnetization direction transverse to the axis of the tubular conduit 34. The orientation and arrangement of the magnets 38 is such that their magnetic field which penetrates through the tubular conduit possesses a maximum field intensity at the region of the conduit walls and a minimum field intensity at the region of the axis of the conduit. This is so because the effect of the air-air ion mixture upon the water to be degerminated is greatest at the region of the conduit axis.

It should be understood that it is also possible to provide, in addition to the magnets 38, further magnets 39 upstream of the nozzle head 37 in order to strive for a more pronounced concentration of the germs or bacteria at the region of the lengthwise axis of the conduit 34 prior to being exposed to the action of the air-air ion mixture.

In the event the water cannot be degerminated during its throughpassage, then it is also possible to arrange a stirrer and at the vanes or blades thereof nozzles or nozzle heads. Such stirrer or agitator is arranged within a container or vessel housing the water to be degerminated and connected with the ion generator. In this case the magnets are advantageously arranged at the vanes of the stirrer mechanism. Equally it should be understood that the permanent magnets could be replaced by electromagnets, particularly if there is required, with lesser expenditure, an adjustment or setting of an optimum field intensity or induction. Thus, conceptually the magnets 38 and 39 can be considered to be electromagnets.

Hereinafter there will now be described in greater detail, on the basis of certain practical fields of application, examples of the method.

EXAMPLE 1

In a swimming pool having a capacity of about 40 $m^3$ the quantity of water circulating through a sand filter amounted to about 170 liters/minute or approximately 10 $m^3$ per hour. Thus, approximately 4 hours are required in order to once circulate the entire capacity of the swimming pool. With the air-air ion action there is initially attained a dilution of the bacterial contaminants which increases with time, but never becomes infinitely small. The water initially has a conductivity of 195 microhms ($195.10^{-6}$ Mho) and a pH of 7.9. The bacteria content is so large that it cannot be counted. In the water circulation conduit there is installed a section of polyethylene pipe of 1½ inch diameter. In such there is welded after the filter and the heat exchanger a ¾ inch nipple at which there is connected an air ion installation. As already mentioned such is essentially constructed in the manner disclosed in Swiss Pat. No. 542,112 and U.S. Pat. No. 3,818,269 and operates with a voltage of about 40 kV applied to corona electrodes formed of rhodium-plated steel tips, which, in turn, diametrically protrude several millimeters into a ¾-inch polyethylene pipe. An air current of 5 $m^3/h$, at an excess pressure of 0.9 bar, produced by a diaphram or membrane compressor, tears away per second at least $10^{12}$ small air ions from the corona electrodes. The air ion concentration is measured in an SK-meter as disclosed in the previously mentioned patents. A small electromagnet is arranged about the ¾-inch polyethylene pipe following the last corona electrode, so that there appears within this pipe or conduit conducting the air-air ion mixture a magnetic field, at the center of which there still exists a magnetic induction of 10 $V.s/m^2$. This conduit or pipe conducting the air-air ion mixture terminates in at least one nozzle which is arranged at the previously mentioned section of the water circulation conduit. At the region of this nozzle there is arranged a further electromagnet. Such is constructed and dimensioned so that the water-conducting polyethylene conduit or pipe extends through its magnetic field which, in turn, is so powerful that at the axis of the conduit there can be measured an induction of about 85 gauss. Electromagnets which, as mentioned, also can be used, in contrast to the permanent magnets, have the advantage that they can be obtained commercially in any size and power and their magnetic field can be varied within wide limits by changing the current intensity. On the other hand, electromagnets consume energy.

Instead of electromagnets it is possible, as already mentioned, to also use a pair of permanent magnets each of 4,000 gauss at a spacing of 4 centimeters. In this instance, the optimum distance of the magnets, located in a plane perpendicular to the mentioned pipe section and 10 centimeters downstream of the air ion inlet nozzle, is to be determined in the following manner: there is ascertained in a model test the nodes of the magnetic field lines, either according to the so-called Delawarr-method or by means of a measuring device as taught in U.S. Pat. No. 2,482,733, the disclosure of which is incorporated herein by reference. The magnets are then fixed such that there appear directly at the inner wall of the pipe section nodes corresponding to an induction of 600 gauss, and such that there simultaneously prevails a node located as closely as possible to the pipe axis and corresponding to an induction of 150 gauss. With this optimum adjustment there is realized, in practical operation, a degermination which theoretically, in 6.75 hours, results in a limit of 2,000 bacteria for each $cm^3$ as generally prescribed by health authorities. In practice it has been however found that this limit is already reached practically after 3 hours. The explanation for this appears to be that the pH-value of the water rapidly drops and even with the starting slightly alkaline pH already is below 7 after 2 hours. In the case of carbonate-containing water there is present a further phenomenon, namely the bactericide action of $CO_2$ due to the release of carbonic acid.

EXAMPLE 2

In a public drinking water reservoir, whose water contains between 200 and 300 coliforme bacteria per 100 ml, depending upon the time of season, due to the field adjoining the water collection area, removal of bacteria or germs from the water should occur without chlorine. The capacity of the reservoir amounted to 50 $m^3$ and the water had a pH of 8.5. An injection of air-air ion mixture containing $10^{14}$ air ions per $cm^3$ by means of nozzles, arranged at the end of the vanes of a three van stirrer, brings about a rapid admixing throughout the entire resevoir. The air-air ion mixture is injected at an excess pressure of 3 bar, and at the nozzles formed of polyamide there is provided in each case a rim of disc magnets of 5 mm diameter and 3 mm thickness, each of which have a remanence of 80 gauss.

The degermination is so effective that it is possible to speak in terms of a true bactericide action and within less than 1 second after penetration of fresh water containing bacteria the bacteria are killed. At the same time the pH-value is reduced to between 6.9 and 7 and the air dissolved in the water on the average exceeds about 11% of the original possible value.

While there are shown and described present preferred embodiments of the invention, it is to be distinctly understood that the invention is not limited thereto, but may be otherwise variously embodied and practiced within the scope of the following claims. Accordingly,

What is claimed is:

1. A method of degerminating water, comprising the steps of:

a. furnishing a supply of flowing water containing bacteria which are to be killed;

b. subjecting the flowing water to a magnetic field;

c. positioning the magnetic field contacting the flowing water for increasing the concentration of bacteria at a predetermined location in the flowing water;

d. introducing an air-air ion mixture having at least $5 \cdot 10^6$ air ions per $cm^3$ into the water at the location where the bacteria are concentrated, whereby the bacteria kill rate is increased by electroshock action.

2. The method as defined in claim 1, wherein commingling of the air-air ion mixture with the water is accomplished by introducing the air-air ion mixture into the water at an excess pressure of at least 0.1 bar.

3. The method as defined in claim 1 wherein the magnetic field which is produced penetrates the water substantially transverse to its direction of flow.

4. The method as defined in claim 1 wherein the magnetic field which is produced has an induction at the region where the air-air ion mixture is effective which amounts to at least 0.5 gauss.

5. The method as defined in claim 1, including the further step of focusing the air-air ion mixture by a magnetic field which has an induction of at least 0.2 gauss before it acts upon the flowing water to be degerminated.

6. An apparatus for the degermination of water, comprising means formed of electrically insulating material for supplying a flow of water, an ion generator capable of introducing an air-air ion mixture having at least $5 \cdot 10^6$ air ions per $cm^3$ into the water and having an outlet, a source of excess pressure connected with the ion generator, the outlet of the ion generator being connected with the water supplying means for injecting an air-air ion mixture into the flowing water, and means for producing a magnetic field in the flowing water at the region where the air-air ion mixture is injected for increasing the concentration of bacteria at the region where the air-air ion mixture is injected to thus increase the kill rate of the bacteria contained in the water by electro-shock action.

7. The apparatus as defined in claim 6, wherein said means for supplying the water to be degerminated comprises a section of a conduit.

8. The apparatus as defined in claim 6, wherein said means for supplying the water to be degerminated comprises a vessel containing the water to be degerminated.

9. The apparatus as defined in claim 6, wherein said ion delivering means includes at least one nozzle opening into the interior of said means for supplying the water to be degerminated, the outlet of the ion generator being connected with said at least one nozzle.

10. The apparatus as defined in claim 9, wherein said means for supplying the water to be degerminated comprises a section of a conduit into which said at least one nozzle opens.

11. The apparatus as defined in claim 6, wherein said means for producing the magnetic field comprises permanent magnets.

12. The apparatus as defined in claim 11, wherein said means for supplying the water to be degerminated comprises a conduit having a section through which flows the water to be degerminated, said permanent magnets being arranged at diametrically opposite sides of said conduit section.

13. The apparatus as defined in claim 11, wherein said means for supplying the water to be degerminated comprises a conduit having a section through which flows the water to be degerminated, said ion delivering means comprising at least one nozzle opening into the interior of the conduit section, the outlet of the ion generator being operatively connected with said nozzle, said nozzle having an outlet defining said outlet region, said permanent magnets being arranged at the region of said outlet of said nozzle.

14. The apparatus as defined in claim 6, wherein said means for producing the magnetic field comprises electromagnets.

* * * * *